United States Patent
Fukushima et al.

(10) Patent No.: US 12,475,923 B2
(45) Date of Patent: Nov. 18, 2025

(54) MAGNETIC RECORDING MEDIUM, MAGNETIC STORAGE APPARATUS, AND METHOD FOR MANUFACTURING MAGNETIC RECORDING MEDIUM

(71) Applicant: Resonac Corporation, Tokyo (JP)

(72) Inventors: Takayuki Fukushima, Chiba (JP); Takehiro Yamaguchi, Chiba (JP); Yuki Sato, Chiba (JP)

(73) Assignee: Resonac Hard Disk Corporation, Chiba (JP)

( * ) Notice: Subject to any disclaimer, the term of this patent is extended or adjusted under 35 U.S.C. 154(b) by 0 days.

(21) Appl. No.: 18/782,557

(22) Filed: Jul. 24, 2024

(65) Prior Publication Data
US 2025/0037739 A1   Jan. 30, 2025

(30) Foreign Application Priority Data
Jul. 25, 2023   (JP) .................. 2023-120812

(51) Int. Cl.
*G11B 5/66* (2006.01)
*G11B 5/851* (2006.01)

(52) U.S. Cl.
CPC .............. *G11B 5/672* (2021.05); *G11B 5/851* (2013.01)

(58) Field of Classification Search
None
See application file for complete search history.

(56) References Cited

U.S. PATENT DOCUMENTS

2022/0358962 A1\* 11/2022 Fukushima ............ G11B 5/653

OTHER PUBLICATIONS

Xu, Chengchao, et al. "Bias sputtering of granular L10-FePt films with hexagonal boron nitride grain boundaries." Scientific Reports, vol. 13, No. 1, Jul. 8, 2023. (Year: 2023).\*
Hexagonal Boron Nitride (h-BN, BN2A1). H, www.hqgraphene.com/h-BN.php (Year: 2017).\*
B. S. D. Ch. S. Varaprasad et al., "FePt-BN granular HAMR media with high grain aspect ratio and high L1 ordering on corning LotusTM NXT glass", AIP Advances, 13, 035002 (2023).

\* cited by examiner

*Primary Examiner* — Holly Rickman
*Assistant Examiner* — Lisa Chau
(74) *Attorney, Agent, or Firm* — IPUSA, PLLC

(57) ABSTRACT

A magnetic recording medium includes a substrate, an underlayer, a first magnetic layer, and a second magnetic layer in this order. The first magnetic layer includes magnetic grains having a $L1_0$ structure, and the second magnetic layer has a granular structure including magnetic grains having a $L1_0$ structure, and a grain boundary portion including hexagonal boron nitride. A (111) plane of the magnetic grains included in the first magnetic layer is covered with boron nitride at an interface with the second magnetic layer. The magnetic grains included in the second magnetic layer are epitaxially grown from a (001) plane of the magnetic grains included in the first magnetic layer. The magnetic grains included in the first magnetic layer and the magnetic grains included in the second magnetic layer are columnar crystals penetrating the first magnetic layer and the second magnetic layer, respectively.

9 Claims, 3 Drawing Sheets

MAGNETIC RECORDING MEDIUM, MAGNETIC STORAGE APPARATUS, AND METHOD FOR MANUFACTURING MAGNETIC RECORDING MEDIUM

CROSS-REFERENCE TO RELATED APPLICATIONS

This application is based upon and claims priority to Japanese Patent Application No. 2023-120812, filed on Jul. 25, 2023, the entire contents of which are incorporated herein by reference.

FIELD

Certain aspects of the embodiments discussed herein are related to magnetic recording media, magnetic storage apparatuses, and methods for manufacturing magnetic recording media.

BACKGROUND

Heat assisted recording systems or microwave assisted recording systems performs recording at a reduced coercivity by locally heating a magnetic recording medium by irradiating near-field light or microwaves. Such heat assisted recording systems (or thermal assist recording systems) and microwave assisted recording systems are being considered as the next-generation recording systems capable of achieving high surface recording densities on the order of 2 Tbit/inch$^2$.

When a magnetic head of the assisted recording system is used, recording can easily be performed on a magnetic recording medium having a coercivity of several tens of kOe at room temperature. Further, magnetic grains having a high magnetocrystalline anisotropy constant (Ku), for example, are used for magnetic grains included in a magnetic layer of the magnetic recording medium. The magnetic grains having the high magnetocrystalline anisotropy constant (Ku) can be miniaturized while maintaining thermal stability, and the coercivity at room temperature can be increased.

Known magnetic grains having the high magnetocrystalline anisotropy constant (Ku) include magnetic grains having a $L1_0$ structure, such as Fe—Pt grains (Ku: $7 \times 10^6$ J/m$^3$ at maximum), Co—Pt grains (Ku: $5 \times 10^6$ J/m$^3$ at maximum), or the like, for example.

As the magnetic layer using magnetic grains having the $L1_0$ structure, B. S. D. Ch. S. Varaprasad et al., "FePt-BN granular HAMR media with high grain aspect ratio and high L1 ordering on corning Lotus™ NXT glass", AIP Advances, 13, 035002 (2023) discloses a magnetic layer having a granular structure in which peripheries of FePt magnetic grains having the $L1_0$ structure are covered with a layered material of hexagonal boron nitride, for example.

It is desirable to further improve a surface recording density of the magnetic recording medium. In order to further improve the surface recording density of the magnetic recording medium, it is important to further reduce a grain diameter of the magnetic grains included in the magnetic layer and to further increase the anisotropy of the magnetic grains.

SUMMARY

Accordingly, it is an object in one aspect of the present disclosure is to provide a magnetic recording medium in which a state where a granular structure is formed inside a granular magnetic layer is stably maintained, and the surface recording density is further improved.

It is also an object in another aspect of the present disclosure to provide a magnetic storage apparatus having such a magnetic recording medium, and a method for manufacturing such a magnetic recording medium.

According to one aspect of the present disclosure, a magnetic recording medium includes a substrate, an underlayer, a first magnetic layer, and a second magnetic layer in this order, wherein the first magnetic layer includes magnetic grains having a $L1_0$ structure, the second magnetic layer has a granular structure including magnetic grains having a $L1_0$ structure, and a grain boundary portion including hexagonal boron nitride, a (111) plane of the magnetic grains included in the first magnetic layer is covered with boron nitride at an interface with the second magnetic layer, the magnetic grains included in the second magnetic layer are epitaxially grown from a (001) plane of the magnetic grains included in the first magnetic layer, and the magnetic grains included in the first magnetic layer and the magnetic grains included in the second magnetic layer are columnar crystals penetrating the first magnetic layer and the second magnetic layer, respectively.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

DESCRIPTION OF EMBODIMENTS

Figure 1:
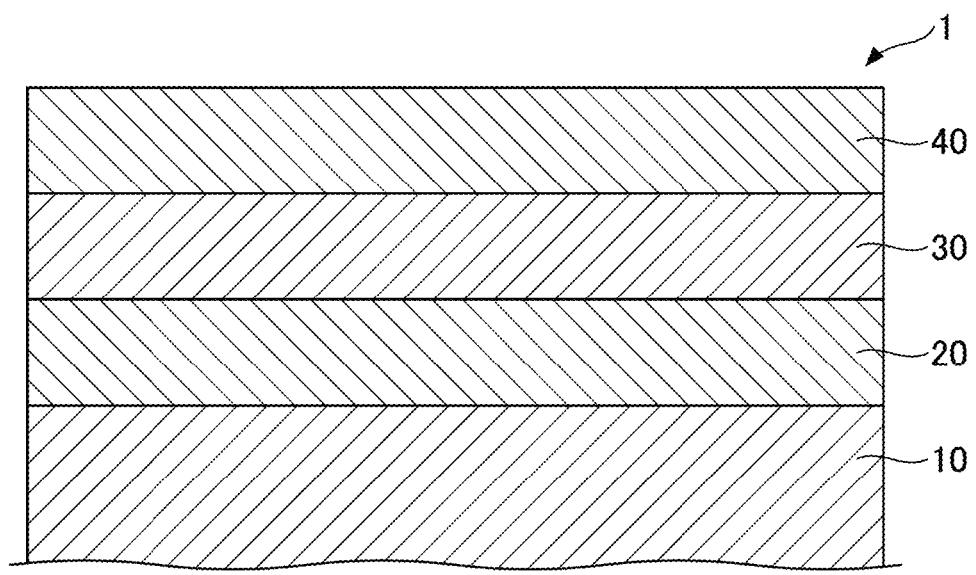
FIG. 1 is a cross sectional view illustrating an example of a layer structure of a magnetic recording medium according to an embodiment of the present invention.

In order to further improve the surface recording density of the magnetic recording medium, it is important to further reduce a grain diameter of the magnetic grains included in the magnetic layer and to further increase the anisotropy of the magnetic grains.

As the magnetic layer including the magnetic grains having such properties, there is a proposed magnetic layer having a granular structure including FePt magnetic grains with a $L1_0$ structure and oriented in the (001) direction, and hexagonal boron nitride at a grain boundary portion. This proposed magnetic layer is hereinafter also simply referred to as "a FePt-hBN granular magnetic layer".

Hexagonal boron nitride has a layered structure in which (001) planes are laminated in parallel, but because a grain boundary portion is easily formed between the FePt magnetic grains, it is possible to reduce a grain diameter (or a grain size) of the FePt magnetic grains. In addition, because the hexagonal boron nitride has a low reactivity with the FePt magnetic grains, the hexagonal boron nitride does not inhibit ordering of the magnetic grains. The hexagonal boron nitride is preferably formed so that the (001) plane thereof surrounds a side surface of the FePt magnetic grain.

However, in FePt-hBN, FePt and hBN in many cases are separated in a direction perpendicular to a substrate surface and form a layered structure, and a granular structure in which the hBN surrounds the FePt magnetic grains cannot be obtained in many cases. Moreover, a component of the grain boundary portion, such as boron nitride (BN), in many cases may not sufficiently crystallize and thus assume an amorphous state. For this reason, there is a problem in that the surface recording density of the magnetic recording medium cannot be improved in some cases, even when the magnetic layer having the granular structure (hereinafter also referred to as a "granular magnetic layer") is used.

According to one aspect of the present disclosure, the object described above can be achieved by the following.

[1] A magnetic recording medium according to one aspect includes:
- a substrate, an underlayer, a first magnetic layer, and a second magnetic layer in this order, wherein:
- the first magnetic layer includes magnetic grains having a $L1_0$ structure,
- the second magnetic layer has a granular structure including magnetic grains having a $L1_0$ structure, and a grain boundary portion including hexagonal boron nitride,
- a (111) plane of the magnetic grains included in the first magnetic layer is covered with boron nitride at an interface with the second magnetic layer,
- the magnetic grains included in the second magnetic layer are epitaxially grown from a (001) plane of the magnetic grains included in the first magnetic layer, and
- the magnetic grains included in the first magnetic layer and the magnetic grains included in the second magnetic layer are columnar crystals penetrating the first magnetic layer and the second magnetic layer, respectively.

[2] In the magnetic recording medium according to [1] above, the boron nitride covering the (111) plane of the magnetic grains included in the first magnetic layer may be hexagonal boron nitride, and a (001) plane of the hexagonal boron nitride may be parallel to the (111) plane.

[3] In the magnetic recording medium according to [1] or [2] above, the hexagonal boron nitride of the grain boundary portion may be formed such that a (001) plane of the hexagonal boron nitride surrounds a side surface of the magnetic grains included in the second magnetic layer.

[4] In the magnetic recording medium according to any one of [1] to [3] above, the magnetic grains having the $L1_0$ structure and included in the first magnetic layer and the second magnetic layer may be FePt alloy grains.

[5] A method for manufacturing the magnetic recording medium according to any one of [1] to [4] above, includes forming a boron nitride layer by sputtering, between forming the first magnetic layer by sputtering and forming the second magnetic layer by sputtering.

[6] A magnetic storage apparatus includes the magnetic recording medium according to any one of [1] to [4] above, and a head configured to record information on and reproduce information from the magnetic recording medium.

According to an aspect of the present invention, it is possible to provide a magnetic recording medium in which a state where a granular structure is formed inside a granular magnetic layer is stably maintained, and the surface recording density is further improved.

According to another aspect of the present invention, it is possible to provide a method for manufacturing a magnetic recording medium in which the state in which the granular magnetic layer forms a granular structure therein is stably maintained and the surface recording density is further improved.

According to a further aspect of the present invention, a magnetic storage apparatus with a high recording capacity (or storage capacity) can be provided.

Hereinafter, embodiments of the present invention will be described with reference to the drawings. For the sake of convenience, in the drawings used in the following description, characterizing portions may be enlarged and illustrated, for example, in order to facilitate the understanding of the characterizing portions. In other words, the drawings are not drawn to scale, and dimensional ratios or the like of constituent elements are not necessarily the same in each drawing and among the drawings. In addition, in the present specification, "a range of A to B", indicating a numerical range, includes a value "A" as a lower limit value of the range and a value "B" as an upper limit value of the range, unless indicated otherwise.

[Magnetic Recording Medium]

FIG. 1 illustrates an example of a layer structure of a magnetic recording medium according to an embodiment. As illustrated in FIG. 1, a magnetic recording medium 1 according to the present embodiment includes a substrate 10, an underlayer 20, a first magnetic layer 30, and a second magnetic layer 40, which are laminated in this order.

A substrate that is generally used for a magnetic recording medium may be used for substrate 10 of the magnetic recording medium 1. For example, a heat-resistant glass substrate having a softening temperature of 500° C. or higher, and preferably 600° C. or higher, may preferably be used for the substrate 10. The heat-resistant substrate can be used for the substrate 10 even in a case where the substrate 10 is heated to a temperature of 500° C. or higher during manufacture of the magnetic recording medium 1.

A material used for the underlayer 20 is not particularly limited, as long as magnetic grains having a $L1_0$ structure and included in the first magnetic layer 30 and the second magnetic layer 40 can be oriented in the (001) direction.

The underlayer 20 may have a multilayer structure including a plurality of laminated layers.

The underlayer 20 preferably includes a NaCl compound. Examples of the NaCl compound include MgO, TiO, NiO, TiN, TaN, HfN, NbN, ZrC, HfC, TaC, NbC, TiC, or the like. The NaCl compound may be a single compound or a combination of two or more compounds selected from these examples of the NaCl compound.

The first magnetic layer 30 includes magnetic grains having the $L1_0$ structure.

Examples of the magnetic grains of the first magnetic layer 30 having the $L1_0$ structure include FePt alloy grains, CoPt alloy grains, or the like, for example. The FePt alloy grains and the CoPt alloy grains are magnetic grains having the $L1_0$ structure and oriented in the (001) direction.

The magnetic grains included in the first magnetic layer 30 are columnar crystals having a shape penetrating the first magnetic layer 30.

A grain diameter of the magnetic grains included in the first magnetic layer 30 is not particularly limited, as long as the magnetic grains have a columnar shape, and may be in a range of 3 nm to 7 nm in equivalent diameter, for example. An average grain diameter of the magnetic grains included in the first magnetic layer 30 can be measured by observation using a transmission electron microscope (TEM), for example.

An aspect ratio of the magnetic grains included in the first magnetic layer 30 depends on a thickness of the first magnetic layer 30, but when a height of the columnar magnetic grains is denoted by t and the equivalent diameter of the columnar magnetic grains is denoted by D, t/D may be in a range of 0.1 to 1.5, for example. The aspect ratio is a value that is obtained by dividing a major axis of the magnetic grains by a minor axis of the magnetic grains. The aspect ratio of the magnetic grains can be determined by dividing a grain height of the magnetic grains measured by observation using an analytical electron microscope (AEM), by the average grain diameter of the magnetic grains measured by observation using the transmission electron microscope (TEM).

A center distance between the magnetic grains included in the first magnetic layer 30 is preferably in a range of 4.0 nm to 8.0 nm, for example. The center distance between the magnetic grains included in the first magnetic layer 30 is more preferably 7.8 nm or less, and even more preferably 7.6 nm or less. When the center distance between the magnetic grains included in the first magnetic layer 30 falls within the preferable range described above, the first magnetic layer 30 can include magnetic grains having a small grain diameter.

The center distance between the magnetic grains refers to the distance between the centers of gravity of mutually adjacent magnetic grains. The center distance between the magnetic grains can be measured by calculating the distance between the centers of gravity of the mutually adjacent magnetic grains, from a surface observation image obtained by the scanning electron microscope (SEM), for example.

The second magnetic layer 40 is a magnetic layer (granular magnetic layer) having a granular structure including magnetic grains having the $L1_0$ structure and a grain boundary portion, and the grain boundary portion includes hexagonal boron nitride.

Examples of the magnetic grains of the second magnetic layer 40 having the $L1_0$ structure include FePt alloy grains, CoPt alloy grains, or the like, for example.

The magnetic grains included in the second magnetic layer 40 are columnar crystals having a shape penetrating the second magnetic layer 40, similar to the magnetic grains included in the first magnetic layer 30.

A grain diameter of the magnetic grains included in the second magnetic layer 40 is not particularly limited, as long as the magnetic grains have a columnar shape, similar to the magnetic grains included in the first magnetic layer 30, and may be in a range of 3 nm to 7 nm in equivalent diameter, for example. An average grain diameter of the magnetic grains included in the second magnetic layer 40 can be measured by a method similar to that used to measure the average grain diameter of the magnetic grains included in the first magnetic layer 30.

An aspect ratio of the magnetic grains included in the second magnetic layer 40 depends on a thickness of the second magnetic layer 40, similar to the aspect ratio of the magnetic grains included in the first magnetic layer 30, but when a height of the columnar magnetic grains is denoted by t and the equivalent diameter of the columnar magnetic grains is denoted by D, t/D may be in a range of 1.2 to 2.5, for example. The aspect ratio of the magnetic grains included in the second magnetic layer 40 can be measured by a method similar to that used to measure the aspect ratio of the magnetic grains included in the first magnetic layer 30.

The hexagonal boron nitride included in the grain boundary portion has a layered structure in which (001) planes are laminated substantially in parallel, and easily forms the grain boundary portion between the magnetic grains included in the second magnetic layer 40, and thus, it is possible to reduce the grain diameter of the magnetic grains included in the second magnetic layer 40. In addition, because the hexagonal boron nitride has a low reactivity with the magnetic grains having the $L1_0$ structure, the hexagonal boron nitride does not inhibit ordering of the magnetic grains included in the second magnetic layer 40. For this reason, the hexagonal boron nitride is preferably formed so that the (001) plane thereof surrounds a side surface of the magnetic grain included in the second magnetic layer 40.

It is difficult to stably form such a granular magnetic layer by a conventional method. That is, because the reactivity between a magnetic alloy and boron nitride is low, a layered structure is formed in which the magnetic alloy and the boron nitride become separated from each other during a film forming process, and the magnetic layer in many cases does not possess a granular structure. Moreover, the boron nitride in many cases does not sufficiently crystallize and thus assumes an amorphous state.

The present inventors conducted studies and conceived that the granular structure of the second magnetic layer 40 can be formed stably, by forming the magnetic layer to have a two-layer structure including the first magnetic layer 30 and the second magnetic layer 40, and epitaxially growing the magnetic grains of the second magnetic layer 40 from the magnetic grains of the first magnetic layer 30, where the first magnetic layer 30 is located closer to the substrate 10 than the second magnetic layer 40 is to the substrate 10.

In this case, because the magnetic grains at a growth surface of the first magnetic layer 30 have the (111) plane in addition to the (001) plane, crystal growth progresses in a direction perpendicular to the (111) plane when forming the second magnetic layer 40, and coarsening of the magnetic grains of the second magnetic layer 40 occurs. In order to prevent the coarsening of the magnetic grains of the second magnetic layer 40, the present embodiment covers the (111) plane of the first magnetic layer 30 with boron nitride. Hence, the magnetic grains of the second magnetic layer 40 can be prevented from coarsening. The preventing coarsening of the magnetic grains of the second magnetic layer 40 will be described later in detail, with reference to FIG. 2A and FIG. 2B.

Figure 2A:
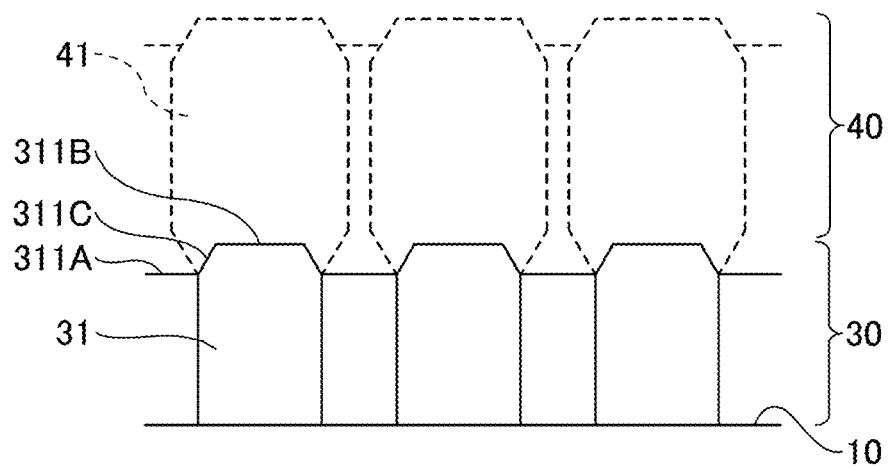
FIG. 2A and FIG. 2B are schematic cross sectional views for explaining crystal growths during formation of a first magnetic layer and a second magnetic layer.
Figure 2B:
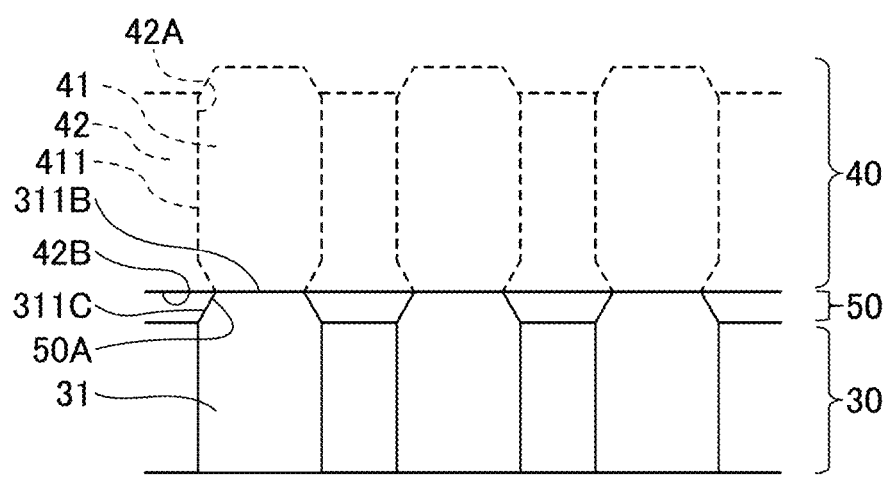

FIG. 2A and FIG. 2B are schematic cross sectional views illustrating crystal growths during formation of the first magnetic layer 30 and the second magnetic layer 40. FIG. 2A illustrates the crystal growths during formation of the first magnetic layer 30 and the second magnetic layer 40 according to a conventional technique, and FIG. 2B illustrates the crystal growth during formation of the first magnetic layer 30 and the second magnetic layer 40 according to the present embodiment.

As illustrated in FIG. 2A, a growth surface 311A of magnetic grains 31 included in the first magnetic layer 30 having the $L1_0$ structure and formed on the substrate 10 is formed with a (001) plane 311B parallel to the substrate 10, and a (111) plane 311C inclined by approximately 35° toward the growth surface 311A (downward in FIG. 2A) with respect to the (001) plane 311B. When the second magnetic layer 40 indicated by a broken line is formed on the (111) plane 311C, the magnetic grains 41 of the second magnetic layer 40 also grow in a direction perpendicular to the (111) plane 311C of the magnetic grains 31, thereby increasing the grain diameter and coarsening the magnetic grains 41 of the second magnetic layer 40.

In contrast, in the present embodiment, the (111) plane 311C of the magnetic grain 31 of the first magnetic layer 30 is covered with a boron nitride layer 50, as illustrated in FIG. 2B. Accordingly, the magnetic grains 41 of the second magnetic layer 40 indicated by a broken line is prevented from coarsening, and the magnetic grains 41 of the second magnetic layer 40 are epitaxially grown on the (001) plane 311B of the magnetic grains 31 of the first magnetic layer 30. Thus, the magnetic grains 31 and 41 are formed into columnar crystals penetrating the first magnetic layer 30 and the second magnetic layer 40, respectively, thereby enabling the magnetic grains 31 and 41 to maintain a small grain diameter (fine grain size).

In the present embodiment, the boron nitride layer 50 is a layer including boron nitride, preferably including 50 atomic percent (at %) or more boron nitride, and most preferably consisting solely of boron nitride. The boron nitride layer 50 is not a continuous film, but is a film partially penetrated between the magnetic grains 31 and the magnetic grains 41.

In the present embodiment, hexagonal boron nitride is preferably used for the boron nitride layer 50 covering the (111) plane 311C of the magnetic grains 31 included in the first magnetic layer 30, and a (001) plane 50A of the hexagonal boron nitride is preferably substantially parallel to the (111) plane 311C. In this case, it is possible to positively prevent the growth of the magnetic grains 41 of the second magnetic layer 40 from the (111) plane 311C of the magnetic grains 31 of the first magnetic layer 30.

In the present embodiment, a hexagonal boron nitride grain boundary portion 42, which is the grain boundary portion of the second magnetic layer 40, is preferably formed so that a (001) plane 42A thereof surrounds a side surface 411 of the magnetic grain 41 included in the second magnetic layer 40. As a result, the magnetic grains 41 of the second magnetic layer 40 are prevented from growing laterally (in an in-plane direction) and coarsening, thereby making it possible to reduce the grain diameter of the magnetic grains 41.

The hexagonal boron nitride grain boundary portion 42 includes hexagonal boron nitride, preferably includes 50 at % or more hexagonal boron nitride, and most preferably consists solely of hexagonal boron nitride.

In the present embodiment, the boron nitride layer 50 covering the (111) plane 311C of the magnetic grains 31 included in the first magnetic layer 30 is preferably formed so that the (001) plane 50A of the boron nitride layer 50 is substantially parallel to the (111) plane 311C of the magnetic grains 31. Further, the hexagonal boron nitride grain boundary portion 42, which is the grain boundary portion of the second magnetic layer 40, is preferably formed so that the (001) plane 42A of the hexagonal boron nitride grain boundary portion 42 surrounds the side surface 411 of the magnetic grains 41 included in the second magnetic layer 40. For this reason, the hexagonal boron nitride grain boundary portion 42 is preferably formed such that a crystal orientation thereof gradually changes at an interface 42B with the boron nitride layer 50.

A content of the hexagonal boron nitride grain boundary portion 42 in the second magnetic layer 40 is preferably in a range of 25 vol % to 50 vol %, and more preferably in a range of 35 vol % to 45 vol %. In a case where the content of hexagonal boron nitride grain boundary portion 42 in the second magnetic layer 40 falls within the range of 25 vol % to 50 vol %, it is possible to increase a coercivity Hc of the magnetic recording medium 1 and an anisotropy of the magnetic grains 31 and 41 included in first magnetic layer 30 and second magnetic layer 40.

A method for measuring the content of the hexagonal boron nitride grain boundary portion 42 in the second magnetic layer 40 is not particularly limited, and a general method for measuring a volume in the grains can be used. For example, the content can be obtained by performing an elemental analysis of the grain boundary portion using transmission electron microscopy electron energy-loss spectroscopy (TEM-EELS).

In the present embodiment, the first magnetic layer 30 may have a granular structure, similar to the second magnetic layer 40. In this case, the content of the grain boundary portion in the first magnetic layer 30 may be similar to that of the second magnetic layer 40.

[Method for Manufacturing Magnetic Recording Medium]

An example of a method for manufacturing the magnetic recording medium 1 will be described. The method for manufacturing the magnetic recording medium 1 includes the steps (or processes) of forming the first magnetic layer 30 by sputtering, forming a boron nitride layer on a principal surface of the first magnetic layer 30 by sputtering boron nitride, and forming the second magnetic layer 40 on a principal surface of the boron nitride layer by sputtering. That is, the magnetic recording medium 1 is manufactured by including the step (or process) of forming the boron nitride layer by sputtering between the step (or process) of forming the first magnetic layer 30 by sputtering and the step (or process) of forming the second magnetic layer 40 by sputtering, and providing the boron nitride layer between the first magnetic layer 30 and the second magnetic layer 40. By using such a manufacturing method, the (111) plane 311C of the magnetic grains 31 at the growth surface of the first magnetic layer 30 can be covered with the boron nitride layer 50, and thus, the magnetic grains 41 of the second magnetic layer 40 can be prevented from coarsening.

By appropriately selecting sputtering conditions of boron nitride, the method for manufacturing the magnetic recording medium 1 can selectively form the boron nitride on only the (111) plane 311C of the magnetic grains 31. In addition, the method for manufacturing the magnetic recording media 1 can form the boron nitride so that the (001) plane 50A of the boron nitride layer 50 becomes substantially parallel to the (111) plane 311C of the magnetic grains 31.

Examples of such a film forming method include a method of using a discharge gas pressure of 2 Pa or less, using a radio frequency (RF) discharge, setting a target surface potential to a range of 50 V to 200 V, performing a heat treatment after film formation (post annealing), and setting a post annealing temperature to be approximately 100° C. higher than a film forming temperature, or the like.

Alternatively, after forming the boron nitride layer 50 so as to cover the entire surface of the magnetic grains 31, the surface of the boron nitride layer 50 may be etched to remove only the hexagonal boron nitride deposited on the (001) plane 311B of the magnetic grains 31, so that the hexagonal boron nitride covers only the (111) plane 311C.

In a case where the RF discharge is used for sputtering to form the boron nitride layer 50, effects of plasma on the substrate 10 is large compared to the case where a DC discharge is used, and nitrogen generated by separation from the boron nitride during the sputtering can easily be taken into the substrate. Because nitrogen is a gas at a film forming temperature of 400° C. or higher, if the post annealing temperature after forming the film increases, the nitrogen tends to deaerate from the surface of the magnetic grains 31. In this case, metal boron generated by deaeration of the nitrogen from the boron nitride during the sputtering of the boron nitride migrates into the grains during the sputtering of the magnetic grains 31 of the first magnetic layer 30, but the metal boron is also deposited on the surface of the magnetic grains 31 by the post annealing. The nitrogen, which tends to deaerate from the surface of the magnetic grains 31, recombines with boron deposited on the surface of the magnetic grains 31, and thus, hexagonal boron nitride is easily formed.

Because the magnetic grains 31 and 41 included in the first magnetic layer 30 and the second magnetic layer 40 form columnar crystals, it is preferable to increase a c-axis orientation, that is, the (001) plane orientation with respect to the substrate 10.

As a method of orienting the magnetic grains 31 and 41 included in the first magnetic layer 30 and the second magnetic layer 40 in the c-axis direction with respect to the substrate 10, it is possible to use a method of using an underlayer 20, and epitaxially growing the first magnetic layer 30 and the second magnetic layer 40 in the c-axis direction, for example.

Another, additional magnetic layer may further be provided under the first magnetic layer 30 or above the second magnetic layer 40. The additional magnetic layer to be newly provided preferably includes magnetic grains having a $L1_0$ structure, similar to the first magnetic layer 30. In addition, the magnetic grains of the additional magnetic layer preferably form columnar crystals together with the magnetic grains 31 and 41.

Accordingly, the magnetic recording medium 1 illustrated in FIG. 1 can be obtained, using the method for manufacturing the magnetic recording medium 1 described above.

Further, the magnetic recording medium 1 preferably includes a protective layer on the second magnetic layer 40.

Examples of the protective layer include a hard carbon film or the like, for example.

Examples of the method of forming the protective layer include radio frequency-chemical vapor deposition (RF-CVD) which decomposes a hydrocarbon gas (source gas) by high-frequency plasma to form a film, ion beam deposition (IBD) which ionizes a source gas by electrons emitted from a filament to form a film, a filtered cathodic vacuum arc (FCVA) which forms a film using a solid carbon target without using a source gas, or the like.

The protective layer preferably has a thickness in a range of 1 nm to 6 nm. When the thickness of the protective layer is 1 nm or more, levitation characteristics of a magnetic head improve. On the other hand, when the thickness of the protective layer is 6 nm or less, a magnetic spacing decreases, and a signal-to-noise ratio (S/N ratio, or SNR) of the magnetic recording medium 1 improves.

In this specification, the thickness of the protective layer refers to the length or distance in a direction perpendicular to the principal surface of the protective layer. The thickness of the protective layer is measured at an arbitrary position in a cross section of the protective layer, for example. In a case where the thickness is measured at several arbitrary positions in the cross section of the protective layer, an average value of the measured thicknesses may be used as the thickness of the protective layer. This measurement method for measuring the thickness of the protective layer can be used for measuring the thickness of other layers.

The magnetic recording medium 1 may further include a lubricant layer on the protective layer.

The lubricant layer can be formed using a liquid lubricant layer. Preferably, the liquid lubricant is chemically stable, has a low friction and a low adsorption. Examples of the liquid lubricant include fluororesin-based lubricants, such as perfluoropolyether-based lubricants including a compound having a perfluoropolyether structure, or the like.

A thickness of the lubricant layer is not particularly limited, and may be in a range of 1 nm to 3 nm, for example.

The magnetic recording medium 1 may include an appropriate and arbitrary layer in addition to the protective layer and the lubricant layer. For example, the magnetic recording medium 1 may include an adhesion layer, a soft magnetic underlayer, an orientation control layer, or the like between any two among the substrate 10, the underlayer 20, and the first magnetic layer 30, as appropriate. The soft magnetic underlayer may include a first soft magnetic layer, an intermediate layer, and a second soft magnetic layer, for example. The orientation control layer may be a single layer, or may be two or more layers including a first orientation control layer, a second orientation control layer, or the like. Materials used for the adhesion layer, the soft magnetic underlayer, the orientation control layer, or the like may be materials generally used for magnetic recording media.

Accordingly, the magnetic recording medium 1 includes the substrate 10, the underlayer 20, the first magnetic layer 30, and the second magnetic layer 40 in this order. The first magnetic layer 30 includes the magnetic grains 31 having the $L1_0$ structure, and the second magnetic layer 40 is a granular magnetic layer including the magnetic grains 41 having the $L1_0$ structure and the hexagonal boron nitride grain boundary portion 42, and the hexagonal boron nitride grain boundary portion 42 includes hexagonal boron nitride. The interface between the (111) plane 311C of the magnetic grains 31 and the second magnetic layer 40 is covered with boron nitride, and the magnetic grains 41 are epitaxially grown from the (001) plane 311B of the magnetic grains 31. Further, the magnetic grains 31 and 41 are formed into the columnar crystals penetrating the first magnetic layer 30 and the second magnetic layer 40, respectively. For this reason, the grain diameters of the magnetic grains 31 and 41 are small and minute (fine grain size), and the magnetic grains 31 and 41 are formed continuously in one direction in a columnar shape.

The magnetic recording medium 1 can increase anisotropy by reducing the grain diameter of the magnetic grains 31 and 41 included in the first magnetic layer 30 and the second magnetic layer 40, respectively, and including the magnetic grains 31 and 41 in a state continuously connected in the same direction. Hence, the magnetic recording medium 1 can stably maintain the state where the granular structure is formed in the second magnetic layer 40, and can stably include the second magnetic layer 40 as a granular magnetic layer, thereby enabling a further improvement of the surface recording density.

Because the magnetic recording medium 1 has the characteristics described above and the first magnetic layer 30 and the second magnetic layer 40 have a high recording density, information can be sufficiently and magnetically recorded in the first magnetic layer 30 and the second magnetic layer 40 by a recording magnetic field of the magnetic head, even when the heat assisted recording system or the microwave assisted recording system is used for the recording system. Accordingly, the magnetic recording medium 1 can be suitably used in a magnetic storage apparatus (or magnetic recording and reproducing apparatus) having a high recording capacity.

[Magnetic Storage Apparatus]

Next, a magnetic storage apparatus using the magnetic recording medium according to the present embodiment will be described. The magnetic storage apparatus according to the present embodiment is not particularly limited to a specific type, as long as the magnetic recording medium according to the present embodiment is included therein. Hereinafter, an example in which information is magnetically recorded on the magnetic recording medium by the magnetic storage apparatus using the heat assisted recording system will be described.

For example, the magnetic storage apparatus according to the present embodiment includes a driving mechanism which drives the magnetic recording medium to rotate in a recording direction, and a magnetic head having a near-field light generator (or near-field light generating element) provided on a tip end thereof. The magnetic storage apparatus further includes a head moving mechanism which moves the magnetic head, and a signal processor which processes signals input to the magnetic head to be recorded on the magnetic recording medium, and processes signals reproduced from the magnetic recording medium by the magnetic head and output from the magnetic head.

The magnetic head which conforms to the heat assisted recording system further has a laser generator which generates laser light for heating the magnetic recording medium, and a waveguide which guides the laser light generated from the laser generator to the near-field light generator.

Figure 3:
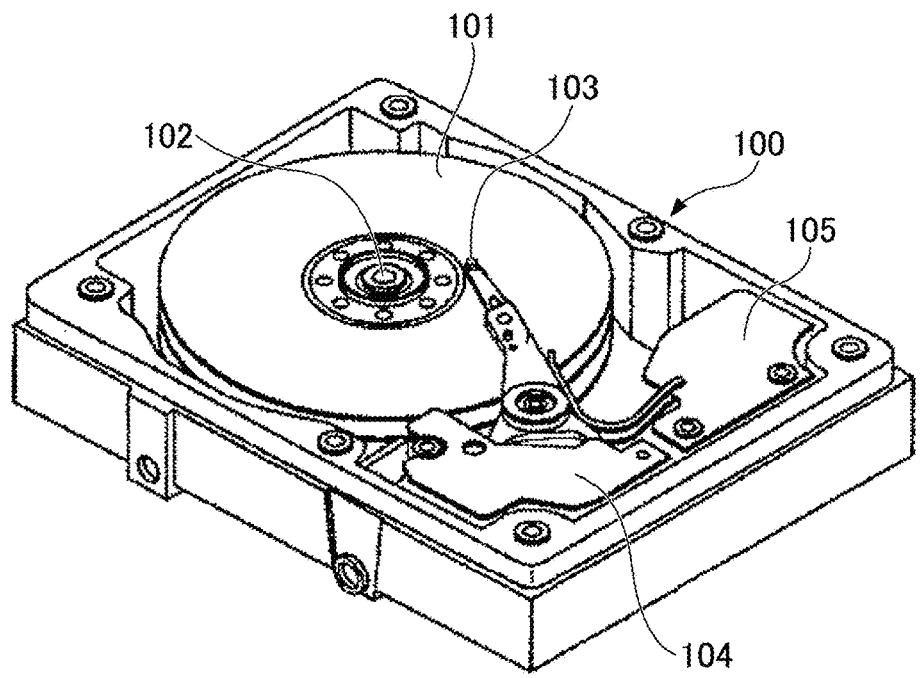
FIG. 3 is a perspective view illustrating an example of a magnetic storage apparatus according to an embodiment of the present invention.

FIG. 3 illustrates an example of the magnetic storage apparatus using the magnetic recording medium according to the present embodiment. As illustrated in FIG. 3, a magnetic storage apparatus 100 includes one more magnetic recording media 101, a driving mechanism 102 which drives the one or more magnetic recording media 101 to rotate, a magnetic head 103 having a near-field light generator (or near-field light generating element) provided on a tip end thereof, a head moving mechanism 104 which moves the magnetic head 103, and a signal processor 105. The signal processor 105 processes signals which are input to the magnetic head 103 to be recorded on the magnetic recording medium 101, and processes signals which are reproduced from the magnetic recording medium 101 by the magnetic head 103 and output from the magnetic head 103. The magnetic recording medium 1 illustrated in FIG. 1 may be used as the magnetic recording medium 101. For example, the magnetic recording medium 101 may have a disk shape, and in this case, the magnetic storage apparatus may form a Hard Disk Drive (HDD).

Figure 4:
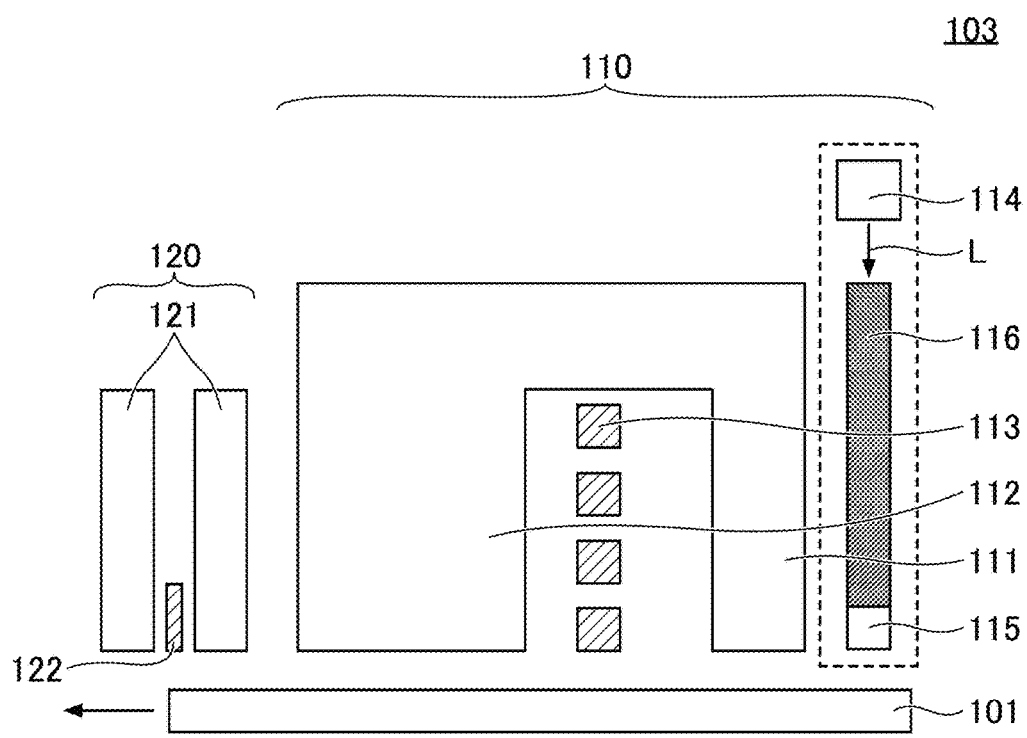
FIG. 4 is a schematic diagram illustrating a magnetic head illustrated in FIG. 3.

FIG. 4 is a schematic diagram illustrating an example of the magnetic head 103 illustrated in FIG. 3. The magnetic head 103 illustrated in FIG. 4 includes a recording (or write) head 110 which records (or writes) signals to the magnetic recording medium 101, and a reproducing (or read) head 120 which reproduces (or reads) signals from the magnetic recording medium 101.

The recording head 110 includes a main magnetic pole 111, an auxiliary magnetic pole 112, a coil 113 which generates a magnetic field, a laser diode (LD) 114 which is an example of the laser generator and generates laser light L, a near-field light generator (or near-field light generating element) 115 which generates near-field light for heating the magnetic recording medium 101, and a waveguide 116. The waveguide 116 guides the laser light L generated from the laser diode 114 to the near-field light generator 115 which is provided on a tip end of the magnetic head 103.

The reproducing head 120 includes a reproducing element 122, such as a TMR (Tunneling Magneto-Resistive) element or the like, for example, that is disposed between a pair of shields 121.

As illustrated in FIG. 3, in the magnetic storage apparatus 100, a central portion of the magnetic recording medium 101 is attached to a rotating shaft of a spindle motor, and records information on and reproduces information from the magnetic recording medium 101 in a state where the magnetic head 103 moves while floating above a surface of the magnetic recording medium 101 which is driven to rotate by the spindle motor.

The magnetic storage apparatus 100 according to the present embodiment can increase the recording density, because it is possible to increase the recording density of the magnetic recording medium 101 by using the magnetic recording medium 1 according to the present embodiment as the magnetic recording medium 101.

Of course, the magnetic storage apparatus 100 may use a magnetic head which conforms to the microwave assisted recording system, in place of the magnetic head 103 which conforms to the heat assisted recording system.

Although embodiments are described above, but the embodiments are presented as examples, and the present invention is not limited to these embodiments. The embodiments described above can be implemented in various other forms, and various combinations, omissions, substitutions, variations, modifications, or the like can be made without departing from the scope and spirit of the invention. These embodiments and modifications thereof are included in the scope and spirit of the invention, and are included in the invention described in the claims and the scope of equivalents thereof.

[Exemplary Implementations]

Hereinafter, embodiments will be described more specifically with reference to exemplary implementations and comparative examples, but the embodiments are not limited to these exemplary implementations and comparative examples.

<Manufacturing Magnetic Recording Medium>

Exemplary Implementation EI1

A Cr-50 at % Ti alloy layer having a thickness of 100 nm, and a Co-27 at % Fe-5 at % Zr-5 at % B alloy layer having a thickness of 30 nm, were successively formed on a glass substrate by sputtering, as the underlayer. Next, after heating the glass substrate to 250° C., a Cr layer having a thickness of 10 nm, and a MgO layer having a thickness of 5 nm, were also successively formed by sputtering, as the underlayer. Then, after heating the glass substrate to 450° C., a Fe-48 at % Pt-5% B alloy layer having a thickness of 0.5 nm was formed by sputtering, as the first magnetic recording layer.

Thereafter, a boron nitride film having a thickness of 0.5 nm was formed by RF sputtering, as a (111) plane covering (or coating) layer. The boron nitride film was formed under film forming conditions including a target surface potential of 100 V, a film formation rate (or deposition rate) of 0.08 nm/sec, and the post annealing temperature set approximately 100° C. higher than the film forming temperature.

Then, etching was performed in an argon atmosphere of 0.5 Pa at 7 W.

As a result, a structure was obtained in which the (111) plane of the magnetic grains of the first magnetic layer was covered with hexagonal boron nitride, and the (001) plane of the hexagonal boron nitride is substantially parallel to the (111) plane of the magnetic grains of the first magnetic layer.

Thereafter, a (Fe-49 at % Pt)–40 vol % hexagonal boron nitride layer having a thickness of 13 nm was successively formed by sputtering, as the second magnetic layer. Next, a carbon film having a thickness of 3 nm was formed as the protective layer, thereby manufacturing the magnetic recording medium.

The composition and coverage condition of the first magnetic layer and the composition of the second magnetic layer are illustrated in Table 1.

Exemplary Implementations EI2 to EI7, and Comparative Examples CE1 to CE8

Magnetic recording media were manufactured in the same manner as in the exemplary implementation EI1, except for the coverage condition for the first magnetic layer that was changed to the coverage conditions illustrated in Table 1.

<Evaluation of Magnetic Recording Medium>

The magnetic recording media manufactured in accordance with the exemplary implementations EI1 to EI7 and the comparative examples CE1 to CE8 were evaluated. The evaluation was performed by confirming the coverage state of the (111) plane of the magnetic grains of the first magnetic layer and the crystallinity of the hexagonal boron nitride (hBN), and measuring the coercivity Hc of the magnetic recording medium and the center distance between the magnetic grains of the first magnetic layer.

(Coverage State of (111) Plane of Magnetic Grains of First Magnetic Layer)

The coverage state of the (111) plane of the magnetic grains of the first magnetic layer was evaluated by observing the cross section of the magnetic recording medium using a transmission electron microscope (TEM HD-2300 manufactured by Hitachi High-Tech Corporation, for example).

(Crystallinity of Hexagonal Boron Nitride (hBN))

The crystallinity of the hexagonal boron nitride (hBN) of the first magnetic layer was evaluated by observing the cross section of the magnetic recording medium using the transmission electron microscope (TEM HD-2300 manufactured by Hitachi High-Tech Corporation, for example), and observing lattice fringes. Because the lattice fringes can be observed at lattice spacings when the crystalline substance is observed on the electron microscope, the crystallinity of the hexagonal boron nitride (hBN) of the first magnetic layer can be confirmed by observing the cross section of the magnetic recording medium using the transmission electron microscope (TEM) and observing the lattice fringes. If the crystallinity of the hexagonal boron nitride (hBN) is satisfactory, it can be evaluated that the state in which the granular structure is formed inside the second magnetic layer is stably maintained, and the second magnetic layer functions as a granular magnetic layer.

(Coercivity Hc of Magnetic Recording Medium)

The coercivity Hc of the magnetic recording media was evaluated by measuring a Kerr rotation angle using a superconducting Kerr measurement device (superconducting Kerr measurement device BH-810HM7 manufactured by Neoark Corporation, for example) by irradiating laser light having a wavelength of 408 nm on the principal surface of the magnetic recording medium. The coercivity Hc reflects the crystallinity of the magnetic grains of the first magnetic layer and the second magnetic layer, and it may be regarded that the coercivity Hc decreases when the crystal structures of the first magnetic layer and the second magnetic layer become disordered to cause lattice defects. For this reason, it can be evaluated that the higher the coercivity Hc is, the higher the crystallinity of the first magnetic layer and the second magnetic layer becomes, and the higher the surface recording density becomes.

(Center Distance Between Magnetic Grains of First Magnetic Layer)

The center distance between the magnetic grains of the first magnetic layer was obtained by calculating the center distance between the centers of gravity of adjacent magnetic grains of the first magnetic layer from a surface observation image obtained by the scanning electron microscope (SEM). It can be evaluated that the smaller the center distance between the magnetic grains is, the smaller the grain diameter of the magnetic grains becomes. For this reason, it can be evaluated that the smaller the center distance between the magnetic grains of the first magnetic layer is, the smaller the grain diameter of the magnetic grains of the first magnetic layer becomes, and the higher the surface recording density becomes. When evaluating the grain diameter of the magnetic grains, an argon etching process was performed for 1 minute in order to remove the carbon protective layer on the surface of the magnetic recording medium.

Table 1 illustrates the evaluation results of the coverage state of the (111) plane of the magnetic grains of the first magnetic layer and the crystallinity of the hexagonal boron nitride (hBN), and measurement results of the coercivity He of the magnetic recording medium and the center distance between the magnetic grains of the first magnetic layer.

TABLE 1

| | First magnetic layer | | | | | Properties of magnetic recording medium | | | |
|---|---|---|---|---|---|---|---|---|---|
| | Coverage condition | | | | | | | | |
| | Composition | Covering material | Thickness [nm] | Post annealing temperature [° C.] with respect to film forming temperature | Etching power [W] | Second magnetic layer Composition | Coverage state of (111) plane of magnetic grains of first magnetic layer | Crystallinity of hBN | Hc [kOe] | Center distance [nm] between magnetic grains of first magnetic layer |
| EI1 | (Fe-48 at % Pt-5 at % B) | BN | 0.5 | +100 | 7 | (Fe-49 at % Pt)-40 vol % hBN | Good | Good | 41.0 | 7.8 |
| EI2 | (Fe-48 at % Pt-5 at % B) | BN | 0.35 | +100 | 10 | (Fe-49 at % Pt)-40 vol % hBN | Good | Good | 39.1 | 7.9 |
| EI3 | (Fe-48 at % Pt-5 at % B) | BN | 0.2 | +100 | 10 | (Fe-49 at % Pt)-40 vol % hBN | Good | Good | 38.0 | 7.9 |
| EI4 | (Fe-48 at % Pt-5 at % B) | BN | 0.2 | +100 | 2 | (Fe-49 at % Pt)-40 vol % hBN | Good | Good | 40.9 | 7.7 |
| EI5 | (Fe-48 at % Pt-5 at % B) | BN | 0.2 | +100 | 4 | (Fe-49 at % Pt)-40 vol % hBN | Good | Good | 41.2 | 7.6 |
| EI6 | (Fe-48 at % Pt-5 at % B) | BN | 0.2 | +100 | 7 | (Fe-49 at % Pt)-40 vol % hBN | Good | Good | 41.7 | 7.6 |
| EI7 | (Fe-48 at % Pt-5 at % B) | BN | 0.2 | +100 | 10 | (Fe-49 at % Pt)-40 vol % hBN | Good | Good | 37.3 | 7.7 |

TABLE 1-continued

|  | First magnetic layer | | | | | | Properties of magnetic recording medium | | | |
| --- | --- | --- | --- | --- | --- | --- | --- | --- | --- | --- |
|  | Coverage condition | | | | | | | | | |
|  | Composition | Covering material | Thickness [nm] | Post annealing temperature [° C.] with respect to film forming temperature | Etching power [W] | Second magnetic layer Composition | Coverage state of (111) plane of magnetic grains of first magnetic layer | Crystallinity of hBN | Hc [kOe] | Center distance [nm] between magnetic grains of first magnetic layer |
| CE1 | (Fe-48 at % Pt-5 at % B) | None | 0 | +100 | 10 | (Fe-49 at % Pt)-40 vol % hBN | No coverage | Good | 37.7 | 9.2 |
| CE2 | (Fe-48 at % Pt-5 at % B) | BN | 0.8 | +100 | 10 | (Fe-49 at % Pt)-40 vol % hBN | (001) plane also covered | Good | 41.8 | 8.6 |
| CE3 | (Fe-48 at % Pt-5 at % B) | BN | 0.2 | +100 | 0 | (Fe-49 at % Pt)-40 vol % hBN | (001) plane also covered | Good | 41.3 | 8.5 |
| CE4 | (Fe-48 at % Pt-5 at % B) | BN | 0.2 | +100 | 30 | (Fe-49 at % Pt)-40 vol % hBN | No coverage | Good | 31.4 | 8.6 |
| CE5 | (Fe-48 at % Pt-5 at % B) | BN | 0.2 | +100 | 70 | (Fe-49 at % Pt)-40 vol % hBN | No coverage | Poor | 13.2 | 10.1 |
| CE6 | (Fe-48 at % Pt-5 at % B) | BN | 0.2 | 0 | 10 | (Fe-49 at % Pt)-40 vol % hBN | Partially covered | Good | 39.4 | 8.4 |
| CE7 | (Fe-48 at % Pt-5 at % B) | BN | 0.2 | +200 | 10 | (Fe-49 at % Pt)-40 vol % hBN | Deterioration of covering film | Good | 43.1 | 8.7 |
| CE8 | (Fe-48 at % Pt-5 at % B) | SiO$_2$ | 0.2 | +200 | 0 | (Fe-49 at % Pt)-40 vol % hBN | Deterioration of covering film | Poor | 6.8 | 7.6 |

It was confirmed from Table 1 that the magnetic recording media in accordance with the exemplary implementations EI1 to EI7 have a high coercivity Hc. Accordingly, it was confirmed that when the (111) plane of the magnetic grains of the first magnetic layer is covered with the hexagonal boron nitride (hBN) and the crystallinity of the hexagonal boron nitride (hBN) is improved, the grain diameter of the magnetic grains included in the first magnetic layer and the second magnetic layer can be reduced, the state in which the granular structure is formed inside the second magnetic layer can be maintained, and the second magnetic layer can function as a granular magnetic layer. Hence, the magnetic recording medium in accordance with each of the exemplary implementations EI1 to EI7 has a high surface recording density, and thus, a magnetic storage apparatus having a high recording capacity can be obtained by using the magnetic recording medium therein.

Although the exemplary implementations are numbered with, for example, "EI1," to "EI7," the ordinal numbers do not imply priorities of the exemplary implementations. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A magnetic recording medium comprising:
    a substrate, an underlayer, a first magnetic layer, and a second magnetic layer stacked in this order, wherein:
    the first magnetic layer includes magnetic grains having a $L1_0$ structure,
    the second magnetic layer has a granular structure including magnetic grains having a $L1_0$ structure, and a grain boundary portion including hexagonal boron nitride,
    a (111) plane of the magnetic grains included in the first magnetic layer is covered with boron nitride at an interface with the second magnetic layer,
    the magnetic grains included in the second magnetic layer are epitaxially grown from a (001) plane of the magnetic grains included in the first magnetic layer, and excluding the (111) plane of the magnetic grains included in the first magnetic layer,
    the magnetic grains included in the first magnetic layer and the magnetic grains included in the second magnetic layer are columnar crystals penetrating the first magnetic layer and the second magnetic layer, respectively,
    the boron nitride covering the (111) plane of the magnetic grains included in the first magnetic layer is hexagonal boron nitride having a (001) plane parallel to the (111) plane,
    the hexagonal boron nitride included in the grain boundary portion of the second magnetic layer has a (001) plane surrounding a side surface of the magnetic grains included in the second magnetic layer, and
    the hexagonal boron nitride included in the grain boundary portion of the second magnetic layer has a crystal orientation that gradually changes at an interface with the boron nitride at the interface between the first magnetic layer and the second magnetic layer.

2. The magnetic recording medium as claimed in claim 1, wherein the magnetic grains having the $L1_0$ structure and included in the first magnetic layer and the second magnetic layer are FePt alloy grains.

3. A method for manufacturing the magnetic recording medium according to claim 1, comprising:
    forming a boron nitride layer by sputtering, between forming the first magnetic layer by sputtering and forming the second magnetic layer by sputtering.

4. A magnetic storage apparatus comprising:
    a magnetic recording medium according to claim 1; and
    a head configured to record information on and reproduce information from the magnetic recording medium.

5. The magnetic recording medium as claimed in claim 1, wherein:
the magnetic grains included in the first magnetic layer has an aspect ratio in a range of 0.1 to 1.5, and
the aspect ratio is determined from t/D, where t denotes a height of the magnetic grains included in the first magnetic layer, and D denotes an equivalent diameter of the magnetic grains included in the first magnetic layer.

6. The magnetic recording medium as claimed in claim 1, wherein:
the magnetic grains included in the second magnetic layer has an aspect ratio in a range of 1.2 to 2.5, and
the aspect ratio is determined from t/D, where t denotes a height of the magnetic grains included in the second magnetic layer, and D denotes an equivalent diameter of the magnetic grains included in the second magnetic layer.

7. The magnetic recording medium as claimed in claim 1, wherein:
the magnetic grains included in the first magnetic layer has a first aspect ratio in a range of 0.1 to 1.5,
the first aspect ratio is determined from $t_1/D_1$, where $t_1$ denotes a height of the magnetic grains included in the first magnetic layer, and $D_1$ denotes an equivalent diameter of the magnetic grains included in the first magnetic layer,
the magnetic grains included in the second magnetic layer has a second aspect ratio in a range of 1.2 to 2.5, and
the second aspect ratio is determined from $t_2/D_2$, where $t_2$ denotes a height of the magnetic grains included in the second magnetic layer, and $D_2$ denotes an equivalent diameter of the magnetic grains included in the second magnetic layer.

8. The magnetic recording medium as claimed in claim 1, wherein a content of the hexagonal boron nitride in the second magnetic layer is in a range of 25 vol % to 50 vol %.

9. The magnetic recording medium as claimed in claim 1, wherein a content of the hexagonal boron nitride in the second magnetic layer is in a range of 35 vol % to 45 vol %.

* * * * *